United States Patent [19]

Kurosaki

[11] Patent Number: 5,017,038
[45] Date of Patent: May 21, 1991

[54] CLAMPING APPARATUS

[75] Inventor: Makoto Kurosaki, Hamamatsu, Japan

[73] Assignee: Yamaha Corporation, Hamamatsu, Japan

[21] Appl. No.: 350,208

[22] Filed: May 11, 1989

[30] Foreign Application Priority Data

May 13, 1988 [JP] Japan ............................ 63-62996[U]

[51] Int. Cl.$^5$ ............................ E04G 7/16; F16B 7/00
[52] U.S. Cl. .................................. 403/385; 403/344; 403/373; 403/375; 403/400; 24/335
[58] Field of Search ................ 24/335, 329, 331, 339, 24/502, 506, 514; 403/385, 344, 373, 375, 386, 400; 285/419, 420

[56] References Cited

U.S. PATENT DOCUMENTS

| | | |
|---|---|---|
| 1,631,831 | 6/1927 | Palmer-Jones .................. 403/385 X |
| 1,706,147 | 3/1929 | Davidson ........................ 24/335 X |
| 1,706,215 | 3/1929 | Davidson ........................ 403/385 X |
| 1,706,801 | 3/1929 | Merrill ............................ 403/385 |
| 1,834,838 | 12/1931 | Hingley .......................... 403/385 |
| 2,165,221 | 7/1939 | Burton ........................... 24/335 X |
| 2,281,522 | 4/1942 | Jaynes ........................... 24/335 |
| 2,945,713 | 7/1960 | Sears ............................. 403/385 X |
| 3,833,776 | 9/1974 | Wampler et al. ............... 24/335 X |
| 3,937,451 | 2/1976 | Di Paola et al. ............... 403/385 X |
| 4,536,019 | 8/1985 | Quaranta ....................... 285/420 X |
| 4,566,819 | 1/1986 | Johnston ........................ 403/385 |
| 4,817,897 | 4/1989 | Kreusel ......................... 403/385 X |

FOREIGN PATENT DOCUMENTS

| | | | |
|---|---|---|---|
| 1233609 | 5/1960 | France ........................... 403/385 |
| 1171137 | 8/1960 | France ........................... 403/385 |
| 57-78088 | 5/1982 | Japan . | |
| 817541 | 10/1951 | Netherlands ................... 403/385 |
| 235320 | 6/1925 | United Kingdom ............. 403/385 |
| 343106 | 2/1931 | United Kingdom ............. 403/385 |
| 1225776 | 3/1971 | United Kingdom ............. 403/385 |

Primary Examiner—Randolph A. Reese
Assistant Examiner—Franco S. De Liguori
Attorney, Agent, or Firm—Burns, Doane, Swecker & Mathis

[57] ABSTRACT

A clamping apparatus includes two tightening tools and a connecting unit. Each tightening tool has a base plate, a press plate, and an urging unit for tightening the base plate and the press plate while a member to be clamped is clamped therebetween. The connecting unit connects the tightening tools with the base plates facing in opposite directions so that the tightening tools can freely pivot relative to each other.

9 Claims, 3 Drawing Sheets

CLAMPING APPARATUS

BACKGROUND OF THE INVENTION

The present invention relates to a clamping apparatus for clamping elongated members to be clamped such as pipes so that an angle between the members to be clamped can be freely adjusted.

A clamping apparatus of this type is used to clamp a pipe for forming a scaffold at a construction site or to set various musical instruments such as tom-toms, a cow bell and an electronic drum set on a musical instrument stand. For example, in order to clamp two pipes in a substantially parallel relationship with respect to each other, an apparatus having an arrangement as shown in FIG. 5 is generally used. That is, a clamping apparatus 1 comprises an elongated base plate 2, and a pair of left and right press plates 4 and 5 opposing the surface of the base plate 2 via members to be clamped 3A and 3B, respectively. The press plate 4 (5) is urged against the member to be clamped 3A (3B) by an urging means comprising bolts 6A and 7A (6B and 7B) and a nut 8 (9), thereby clamping the member to be clamped 3A (3B) between the base plate 2 and the press plate 4 (5). A pair of left and right holding grooves 10 and 11 are formed in the surface of the base plate 2, i.e., the surface opposing the press plates 4 and 5 in a direction perpendicular to the longitudinal direction of the plate 2. The members to be clamped 3A and 3B abut against the grooves 10 and 11, respectively, thereby preventing a positional deviation thereof. Similarly, holding grooves 12 and 13 for positioning the members to be clamped 3A and 3B are formed in central portions of the inner surfaces of the press plates 4 and 5, respectively. Notched holes 14A and 14B are formed at the outer ends of the press plates 4 and 5, respectively. The inner ends of the press plates 4 and 5 are pivotally connected to the proximal end portions of the bolts 6A and 6B by connecting pins 15, respectively. The distal end portions of the bolts 6A and 6B are inserted in insertion holes 16 formed in central portions of the base plate 2. Nuts 8 are threadably engaged with projecting ends of the bolts 6A and 6B. The proximal end portions of the bolts 7A and 7B are inserted in notched recesses 19A and 19B formed in both end faces of the base plate 2, respectively, and pivotally connected thereto by shaft pins 20. The T nut 9 is threadably engaged with the distal end portion of the bolt 7A (7B) and screwed in the notched hole 14A (14B) of the press plate 4 (5) upon clamping of the member to be clamped 3A (3B), thereby locking the outer end of the press plate 4 (5). By tightening the T nuts 9, the press plates 4 and 5 are urged against the members to be clamped 3A and 3B, respectively.

For example, one of the members to be clamped 3A and 3B is a pipe of a musical instrument stand, and the other one is a holder of a musical instrument to be mounted on the stand.

Reference numerals 21 denote compression coil springs for preventing looseness of the nuts 9.

The conventional clamping apparatus 1 having the above arrangement, however, is for clamping the members to be clamped 3A and 3B in a substantially parallel relationship with respect to each other. That is, a clamping angle between the members to be clamped cannot be changed. Therefore, in order to clamp the members to be clamped at a right angle, a clamping apparatus having a shape suitable for this purpose must be used. As a result, since the number of types of the clamping apparatuses 1 is increased, manufacture and management of the apparatuses become troublesome. For this reason, a clamping apparatus, in which base plates of two tightening tools are connected by a bent connecting rod having a predetermined length so that an angle between the two tightening tool can be freely adjusted, has been developed. In this clamping apparatus, however, since the connecting rod tends to be elongated because screws are used to connect the base plates to the connecting rod, a distance between members to be clamped cannot be shortened. In addition, the manufacturing cost of this apparatus is undesirably high.

SUMMARY OF THE INVENTION

It is a first object of the present invention to provide a clamping apparatus capable of freely changing a relative clamping angle between two members to be clamped with a simple arrangement.

It is a second object of the present invention to provide a clamping apparatus capable of arranging members to be clamped closer to each other than in a conventional apparatus.

In order to achieve the above objects of the present invention, there is provided a clamping apparatus comprising two tightening tools each including a base plate, a press plate, and urging means for tightening the base plate and the press plate while a member to be clamped is clamped therebetween, and connecting means for connecting the tightening tools with the base plates facing in opposite directions so that the tightening tools can freely pivot relative to each other.

According to the clamping apparatus of the present invention, by pivoting the base plates of the tightening tools connected back to back by the connecting means, a relative clamping angle of the members to be clamped which are clamped by the tightening tools can be freely changed. In addition, since the base plates are connected back to back, a distance between the members to be clamped is shortened.

DETAILED DESCRIPTION OF THE PREFERRED EMBODIMENTS

Embodiments of the present invention will be described in detail below with reference to the accompanying drawings.

Figure 1:
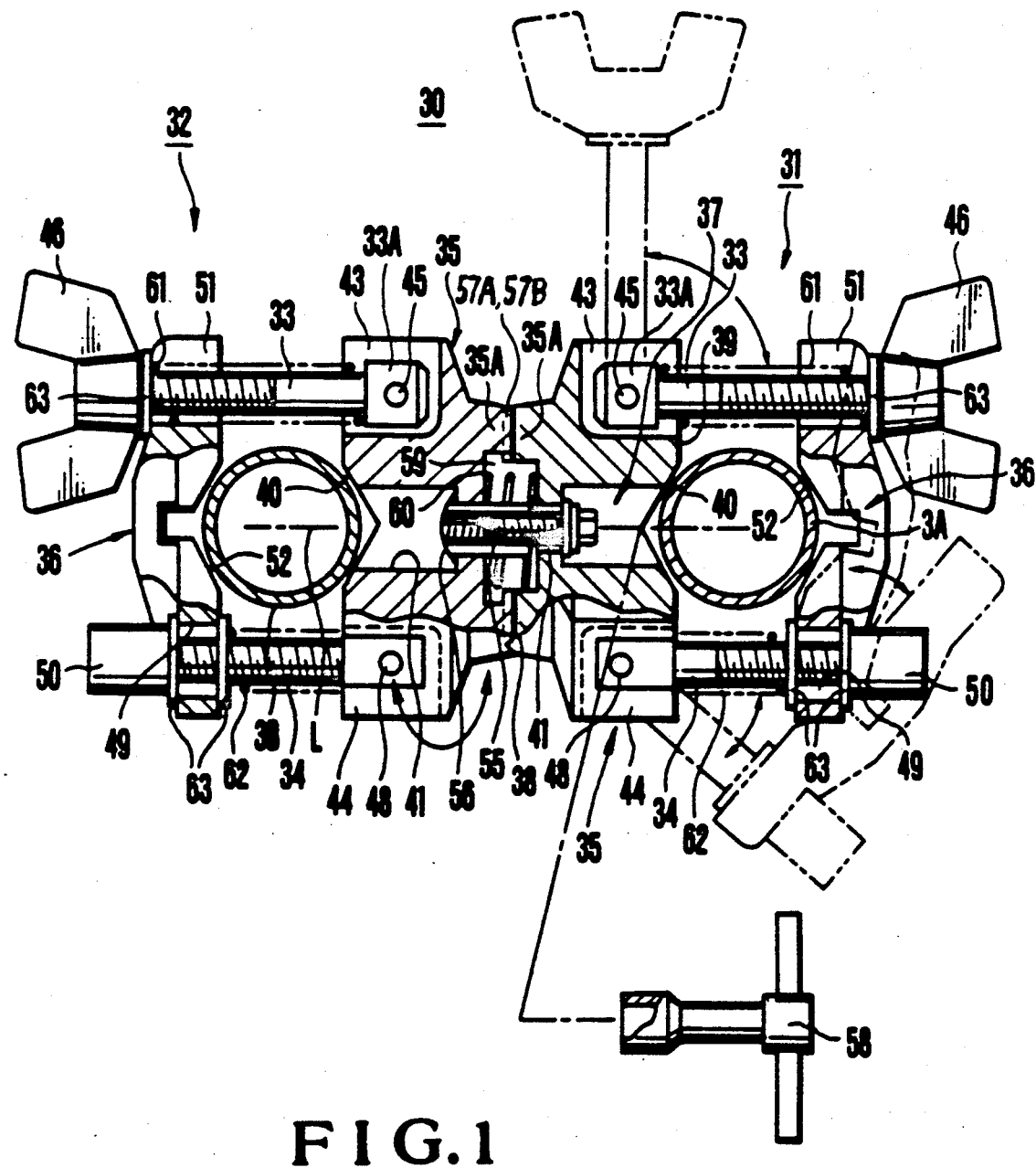
FIG. 1 is a partially cutaway front view showing a first embodiment of the present invention.
Figure 2:
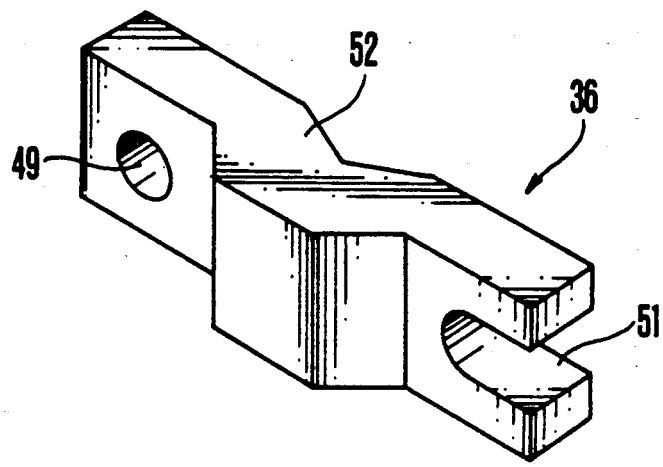
FIG. 2 is a perspective view showing a press plate.

FIG. 1 shows a first embodiment of a clamping apparatus according to the present invention, and FIG. 2 shows a press plate. In FIGS. 1 and 2, a clamping apparatus 30 comprises two tightening tools 31 and 32 having the same structure and a connecting means 37. The tightening tool 31 (32) includes a base plate 35 and a press plate 36, opposite to each other, and connected by an urging means having pairs of bolts 33 and 34 and nuts 46 and 50 so as to be urged against each other, thereby clamping members to be clamped 3A and 3B. The connecting means 37 connects the base plates 35 of the tightening tools 31 and 32 back to back so that the base plates 35 can relatively pivot about a center line L of the tightening tools 31 and 32.

Note that the center line L extends in a connecting direction of the tightening tools 31 and 32 through substantially the center of the connecting means 37.

A V-shaped holding groove 40 is recessed in the center of the outer surface of the base plate 35 of the tightening tool 31 (32), i.e., a surface 39 opposing the press plate 36 in a direction perpendicular to the drawing surface of FIG. 1. A bolt insertion hole 41, both ends of which are open to inner and outer surfaces 38 and 39, is formed through the center of each plate 35. Rectangular notched recesses 43 and 44 which open to the side end faces and the outer surface 39 of the base plate 35 are formed in both end portions of the plate 35 in correspondence with the bolts 33 and 34, respectively. A head portion 33A of the bolt 33 is inserted in the notched recess 43 and supported by a shaft 45 so as to pivot in the direction of the illustrated arrow within an angle range of about substantially 90°. A wing nut 46 is threadably engaged with the distal end portion of the bolt 33. A notched hole 51 with which the bolt 33 is threadably engaged is formed in one end face of the press plate 36.

Similarly, a head portion of the other bolt 34 is inserted in the notched recess 44 and supported by a shaft 48 so as to freely tilt. The distal end portion of the bolt 34 is inserted in an insertion hole formed in the other end portion of the press plate 36. A nut 50 is threadably engaged with a projecting end of the bolt 34. The insertion hole 49 is elongated along the longitudinal direction of the press plate 36 and therefore has a gap (floating gap) with which the bolt 34 can sufficiently swing relatively to the longitudinal direction of the hole 49. As a result, the press plate 36 can tilt as indicated in phantom in FIG. 1 in the surface direction thereof. This arrangement is effective to facilitate mounting/removal of the member to be clamped 3A. A maximum pivoting angle is determined by the floating gap and the thickness of the press plate 36. In this case, the insertion hole 49 need not be an elongated hole but can be a circular hole.

A V-shaped holding groove 52 is formed in a central portion of the inner surface of the press plate 36 in correspondence with the holding groove 40 of the base plate 35.

Note that springs 61 and 62 for preventing looseness of the nuts 46 and 50 are elastically fitted on the bolts 33 and 34, respectively. Reference numerals 63 denote plain washers.

The connecting means 37 comprising a tightening bolt 55 inserted in the bolt insertion holes 41 formed in substantially the centers of the base plates 35 of the tightening tools 31 and 32, and a nut 56 threadably engaged with the tightening bolt 55. Teeth 57A and 57B are formed on the rear surfaces of the base plates 35 and mesh with each other. The teeth 57A and 57B have the same pitch and shape. For example, the teeth 57A (57B) comprise a large number of triangular projections formed radially throughout the entire periphery of the rear surface of the base plate 35. The teeth 57A and 57B mesh with each other with their threads and roots being engaged with each other.

The tightening bolt 55 preferably has a head portion having the same shape as that of a tightening bolt for tautening the head of a drum and therefore can be tightened by a drum tuning key 58. Annular projections 35A are formed on the peripheries of opening portions at the rear sides of the bolt insertion holes 41 formed in the base plates 35 and define a closed space 59 therebetween when the base plates 35 are brought into contact back to back with each other. A spring 60 for preventing looseness of the tightening bolt 55 is elastically fitted in the space 59 and urges the plates 35 from the inside. Note that each insertion hole 41 has a step.

In the clamping apparatus 30 having the above arrangement, in order to clamp the member to be clamped 3A by the tightening tool 31, the bolt 33 is removed from the notched hole 51 of the press plate 36 and tilted as indicated in phantom in FIG. 1. The member to be clamped 3A is inserted between the base plate 35 and the press plate 36 so that its circumferential surface is partially engaged with the holding grooves 40 and 52. At this time, the press plate 36 released from the bolt 33 can freely tilt about the bolt 34 and therefore is opened outward by a biasing force of the spring 62 to facilitate insertion of the member to be clamped 3A. If necessary, by tilting the bolt 34 itself outward as indicated in phantom in FIG. 1, insertion of the member to be clamped 3A is further facilitated. After the member to be clamped 3A is inserted between the base plate 35 and the press plate 36, the press plate 36 is brought into contact with the circumferential surface of the member to be clamped 3A, and the bolt 33 is raised and inserted in the notched hole 51 of the press plate 36. Thereafter, the wing nut 46 and the nut 50 are tightened to urge the press plate 36 against the member to be clamped 3A.

In this embodiment, the two members to be clamped 3A and 3B are clamped in substantially parallel with each other. In order to clamp the members 3A and 3B at an arbitrary angle formed therebetween, the tightening bolt 55 is loosened to pivot one base plate 35 through a desired angle with respect to the other base plate 35, thereby adjusting the position of one of the tightening tools 31 relative to the other tightening tool. Thereafter, the tightening bolt 55 is tightened to integrally combine the base plates 35, and then the members to be clamped 3A and 3B are clamped by the tightening tools 31 and 32.

According to the clamping apparatus having the above arrangement, a relative clamping angle between the two members to be clamped 3A and 3B can be arbitrarily changed. Therefore, a highly versatile clamping apparatus can be provided. In addition, since the two tightening tools 31 and 32 are connected back to back by the connecting means 37, the apparatus itself can be made compact. Therefore, a distance between the members to be clamped 3A and 3B can be shortened.

Figure 3:
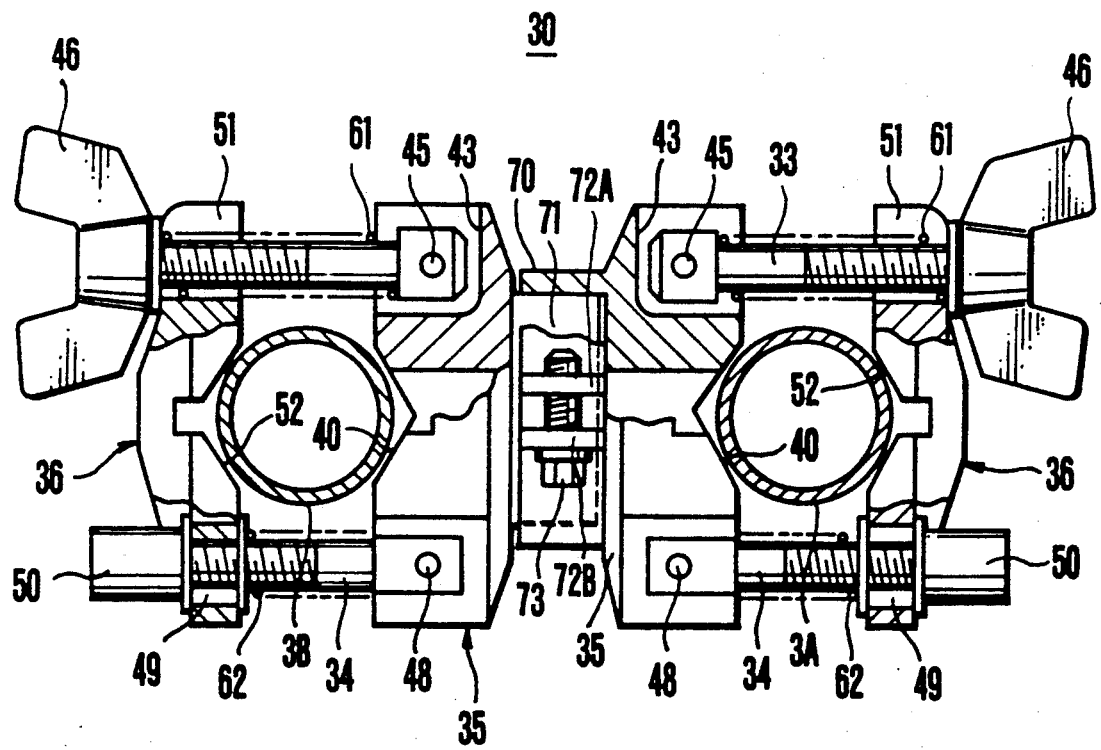
FIG. 3 is a partially cutaway front view showing a second embodiment of the present invention.
Figure 4:
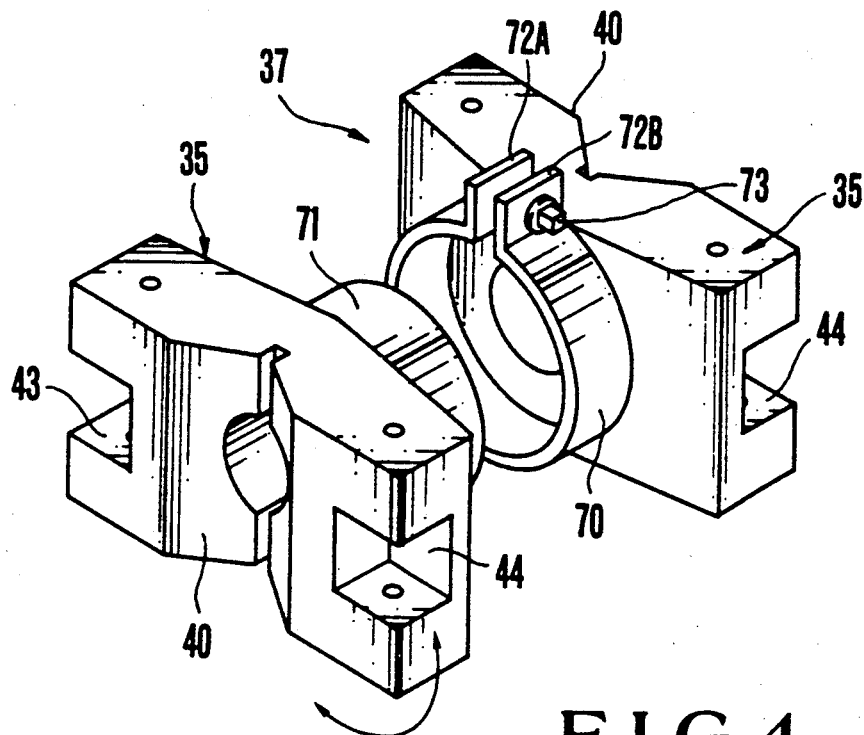
FIG. 4 is a perspective view showing a base plate.
Figure 5:
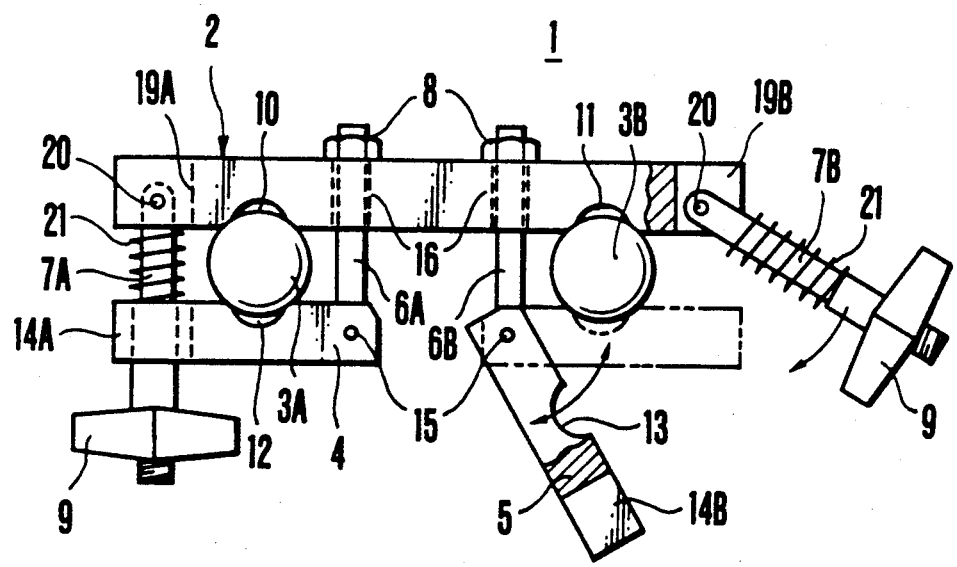
FIG. 5 is a view showing a conventional prior art clamping apparatus.

FIG. 3 shows a second embodiment of the present invention, and FIG. 4 shows a base plate thereof. The second embodiment differs from the first embodiment in that a connecting means 37 for tightening tools 31 and 32 comprises a ring 70 projecting integrally from the rear surface of one base plate 35 and partially notched to be open at its circumferential wall, a projecting portion 71 projecting integrally from the rear surface of the other base plate 35 and fitted in the inner circumferential surface of the ring 70, and a bolt 73 for tightening bolt mounting portions 72A and 72B formed integrally with notched open ends of the ring 70 and opposing each other, in the second embodiment. Other arrangements of the second embodiment are similar to those of the first embodiment.

In this arrangement, a relative clamping angle between members to be clamped 3A and 3B can be continuously, variably set upon pivoting motion of the base plates 35.

As has been described above, according to the clamping apparatus of the present invention, the two tightening tools for clamping the members to be clamped are connected back to back by the connecting means so that they can pivot relative to each other about their center line. Therefore, a relative clamping angle between the members to be clamped can be freely adjusted and changed while the apparatus is made compact in size. In addition, since the members to be clamped can be fixed close to each other, an effect of the present invention is significant in practical use.

What is claimed is:

1. A clamping apparatus comprising:
   two tightening tools each including a base plate, a press plate, and urging means for tightening said base plate and said press plate of each tool toward one another while a member to be clamped is clamped therebetween, each of said urging means including first and second bolts and first and second nuts, one end of the first bolt being positioned in a notched recess formed in the respective base plate and being connected to a shaft disposed in the notched recess so that the first bolt can pivot about the axis of the shaft, the opposite end of the first bolt extending through an insertion hole formed in the respective press plate, said first nut threadably engaging the opposite end of the first bolt to secure the first bolt to the respective press plate whereby said press plate pivots with the first bolt when the first bolt is pivoted about the axis of the shaft to which the first bolt is connected;
   connecting means for connecting said tightening tools to one another with said base plates facing in opposite directions and for permitting said base plates to move relative to one another so that said tightening tools can freely pivot relative to each other, said connecting means extending through a substantially centrally located insertion hole in both of the base plates and said base plates having rear surfaces that face one another; and
   spring means positioned between the facing rear surfaces of the two base plates for urging the two base plates away from each other, to thereby inhibit the connecting means from becoming loosened.

2. An apparatus according to claim 1, wherein one end of said second bolt is positioned in another notched recess formed in the respective base plate and is connected to a shaft so as to be pivotally movable about the axis of the shaft to which the second bolt is connected.

3. An apparatus according to claim 2, wherein a notched hole is formed in one end face of each of said press plates, the opposite end of said second bolt being removably positioned in said notched hole and said second nut threadably engaging the opposite end of the second bolt.

4. An apparatus according to claim 3, further comprising a looseness preventing spring fitted on each of said first and second bolts.

5. An apparatus according to claim 1, wherein said connecting means includes a tightening bolt extending through the insertion hole in each base plate, and a nut threadably engaged with said tightening bolt.

6. An apparatus according to claim 5, wherein teeth are formed on the rear surfaces of said base plates such that the teeth of one base plate mesh with the teeth of the other base plate.

7. An apparatus according to claim 5, wherein an integrally formed annular projection surrounds each of the insertion holes and extends axially away from the rear surface of the respective base plate towards the other base plate, the annular projections contacting one another to define a closed space therebetween, said spring means including a looseness preventing spring fitted on said tightening bolt at a position located in said closed space.

8. An apparatus according to claim 7, wherein teeth are formed on contacting surfaces of said annular projections, the teeth of one annular projection engaging the teeth of the other annular projection.

9. An apparatus according to claim 1, including a washer positioned on the first bolt in abutting relation to an inner surface of the press plate which faces the base plate, and a spring which encircles the first bolt and abuts against the base plate and the washer.

* * * * *